United States Patent [19]

Straayer

[11] Patent Number: 4,978,184
[45] Date of Patent: Dec. 18, 1990

[54] LASER RASTER SCANNER HAVING PASSIVE FACET TRACKING

[75] Inventor: Ronald J. Straayer, South Windsor, Conn.

[73] Assignee: The Gerber Scientific Instrument Company, South Windsor, Conn.

[21] Appl. No.: 260,476

[22] Filed: Oct. 20, 1988

[51] Int. Cl.$^5$ .............................................. G02B 26/10
[52] U.S. Cl. ........................................ 350/6.3; 350/6.8
[58] Field of Search ................... 350/6.1, 6.2, 6.3, 6.4, 350/6.5, 6.6, 6.7, 6.8, 6.9, 6.91, 486, 487

[56] References Cited

U.S. PATENT DOCUMENTS

| | | | |
|---|---|---|---|
| 4,170,028 | 10/1979 | DeBenedictis et al. | 350/6.7 |
| 4,205,348 | 5/1980 | DeBenedictis et al. | 350/6.7 |
| 4,386,272 | 5/1983 | Check et al. | 250/236 |
| 4,408,825 | 10/1983 | Ike | 350/6.8 |
| 4,429,220 | 1/1984 | Noguchi | 250/236 |
| 4,433,849 | 2/1984 | Hanson et al. | 350/6.8 |
| 4,447,723 | 5/1984 | Newmann | 250/236 |
| 4,538,181 | 8/1985 | Taylor | 358/208 |
| 4,580,422 | 4/1985 | Karlsson | 350/6.8 |
| 4,692,629 | 9/1987 | Nakamura | 350/6.8 |
| 4,710,621 | 12/1987 | Loy | 250/334 |
| 4,720,632 | 1/1988 | Kaneko | 350/6.8 |
| 4,728,789 | 3/1988 | Broockman et al. | 350/3.71 |
| 4,733,064 | 3/1988 | Ishikawa | 350/6.8 |
| 4,795,224 | 1/1989 | Goto | 350/6.3 |

*Primary Examiner*—Rodney B. Bovernick
*Assistant Examiner*—Ronald M. Kachmarik
*Attorney, Agent, or Firm*—McCormick, Paulding and Huber

[57] ABSTRACT

A novel laser raster scanner that scans, in response to control signals from a controller, an exposure beam across a substrate by means of a rotating polygonal mirror having a plurality of reflective facets provides passive facet tracking by means of a plurality of glass windows configured with the polygonal mirror to cooperate with corresponding ones of the reflective facets. A first beam steering mechanism provides the laser beam to a window at a first surface thereof. A second beam steering mechanism receives the laser beam from an opposed second window surface and provides an illumination beam to the corresponding reflective facet. Each window is positioned to displace the laser beam from the incident axis so as to produce a corresponding displacement of the illumination beam on the facet in the direction of mirror rotation.

13 Claims, 5 Drawing Sheets

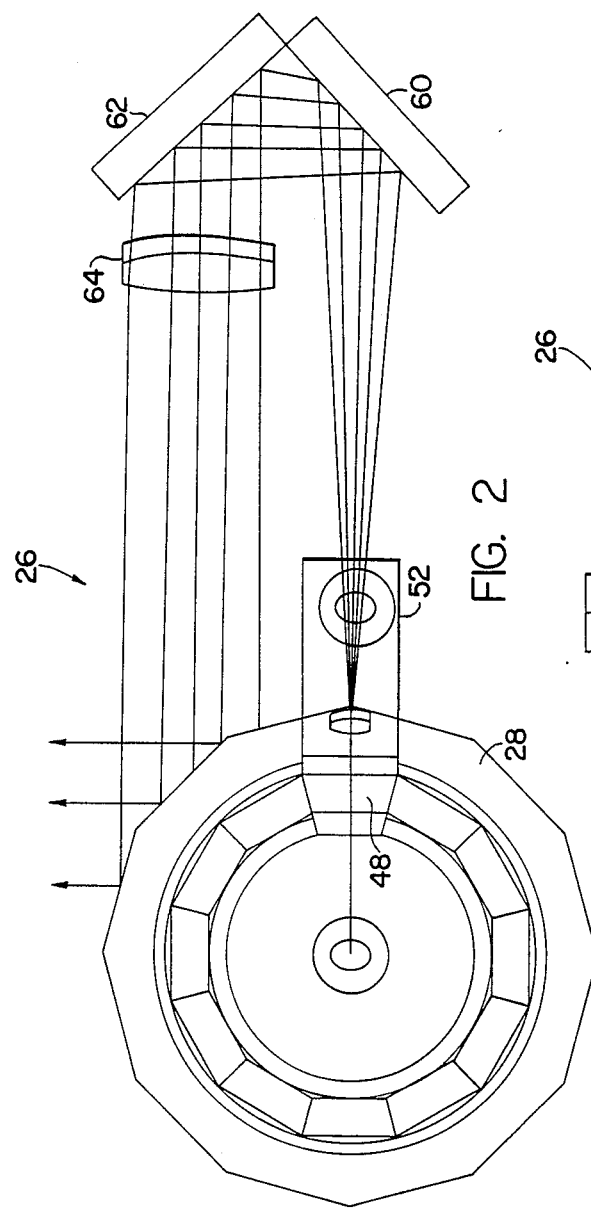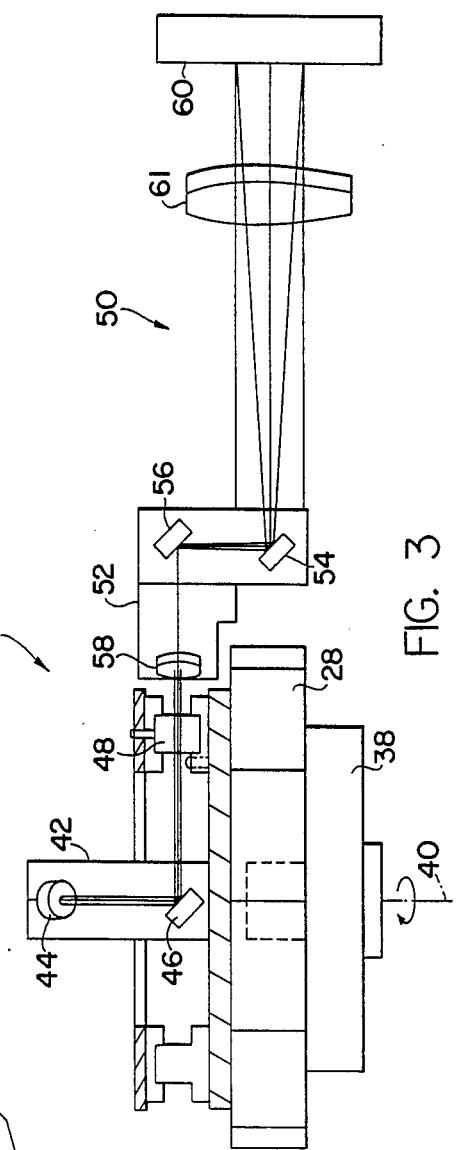
FIG. 2
FIG. 3

LASER RASTER SCANNER HAVING PASSIVE FACET TRACKING

TECHNICAL FIELD

This invention relates to laser raster scanners, and more particularly to an apparatus used with laser raster scanners that provides passive facet tracking for high optical efficiency.

BACKGROUND OF THE INVENTION

High speed optical scanning systems such as precision plotters, printers and the like are well known in the art. These devices are direct imaging systems and are used to fabricate printed circuit boards (PCB) and printing plates by raster scanning an exposure beam across a resist coated printed circuit board or plate which is further processed into a printed circuit board layer or a printing plate, respectively. A typical system as marketed by the Gerber Scientific Instrument Company, the assignee of the present application, consists of a magnetic tape drive, hard disk, computer interactive graphics terminal, image processor and an optical table having a movable scanner. The system may also include such optics, media carriage and electronics as is necessary to directly transfer computer aided design (CAD) data to a (PCB) layer or transfer fonts, graphics and half-toned images into a printing plate.

In operation, the direct imaging system is configured to receive on the write platen a planar substrate of aluminum (in the case of graphic arts) or copper clad dielectric (in the case of printed circuit boards) which has had an optically sensitive photopolymer applied to its surface. The computer modulates the intensity of an optical beam usually provided by a laser to expose selected portions of the substrate. Typically, there is a second beam reference which is also scanned simultaneously with the exposure beam for generating a scanned timing signal to accurately control the position of the exposure (or write beam) on the substrate. A flat field scanning system is sometimes employed to focus the beams and to accomplish the simultaneous scanning of the beams across a reference mask and the substrate, respectively. Precision air bearings are often used to guide the write platen as the substrate is imaged.

In known laser raster scanning systems where the optical deflector is a scanning multifaceted mirror, there are typically three scanning modes. The first mode is where the illuminated facet is underfilled. That is, less than the entire facet is filled with the exposure beam. In the second mode, the exposure beam overfills the facet by extending beyond the borders of the illuminated facet. The third and most desirable of the scanning modes is where the facet is exactly illuminated by the exposure beam. In addition, scanners operating in this third mode also comprise a means for displacing illumination beams (both the exposure and reference beams) relative to the rotating polygon or pyramid to track the facet and improve scanning efficiency. Known scanning systems which are characterized by facet tracking do so in an active manner. These systems include an electromechanical or acousto-optical device for physically displacing the beam relative to the polygonal facet. The active device is controlled by means of a controller which must be operated in a closed loop manner. In turn, closed loop operation requires additional components, such as a detector to provide optical feedback to the controller for calibration and accurate operation.

It would be desirable to provide a laser scanning system characterized by a facet tracking apparatus that is passive requiring no electronics for operation and which could be operated in an open loop manner. The present invention is drawn towards such a scanning system.

SUMMARY OF THE INVENTION

An object of the present invention is to provide an apparatus for use with a laser scanning system which will provide passive facet tracking.

Another object of the present invention is to provide for an apparatus for use with a laser scanning system which will optically compensate for facet-to-mirror rotational axis angular error.

According to the present invention, a laser raster scanner that scans, in response to control signals from a controller, an exposure beam across a substrate by rotating a polygonal mirror having a plurality of reflective facets includes an apparatus that has a plurality of glass windows configured with the polygonal mirror to cooperate with corresponding ones of the reflective facets. A first beam steering mechanism provides for a laser beam along an axis to the window at a first surface thereof. A second beam steering means receives the laser beam from an opposed second window surface and provides illumination beams to the corresponding one of the reflective facets. Each of the glass windows is positioned to displace the laser beam from the beam incident axis so as to produce a corresponding displacement of the illumination beams in the direction of the mirror rotation and in synchronism with the mirror motion so that the facet contains the entire illumination beam cross section during the scan at a high scan duty cycle.

According to another object of the present invention, a laser raster scanner for scanning an exposure beam across a substrate includes a laser for generating a laser beam and an addressable beam modulator for providing modulation of the laser beam, a rotating polygonal mirror that has a plurality of reflective facets. Also included is an optical displacement mechanism that has a plurality of glass windows configured with the mirror to cooperate with corresponding ones of the facets. A first beam steering mechanism provides the laser beam along an axis to the plates at a first surface thereof. A second beam steering mechanism receives the laser beam from the opposed window second surface and provides the illumination beams to the corresponding one of the reflective facets. Each of the glass windows is positioned to displace the laser beam from the beam incident axis so as to produce a corresponding displacement of the illumination beams on the facet in the direction of mirror rotation. A mechanism is further included for controlling the beam modulator and the rotating mirror.

BRIEF DESCRIPTION OF THE DRAWINGS

FIG. 2 is a top view of an optical assembly providing passive facet tracking in the system of FIG. 1.

FIG. 3 is a side view of the optical assembly of FIG. 2.

DESCRIPTION OF THE PREFERRED EMBODIMENT

Figure 1:
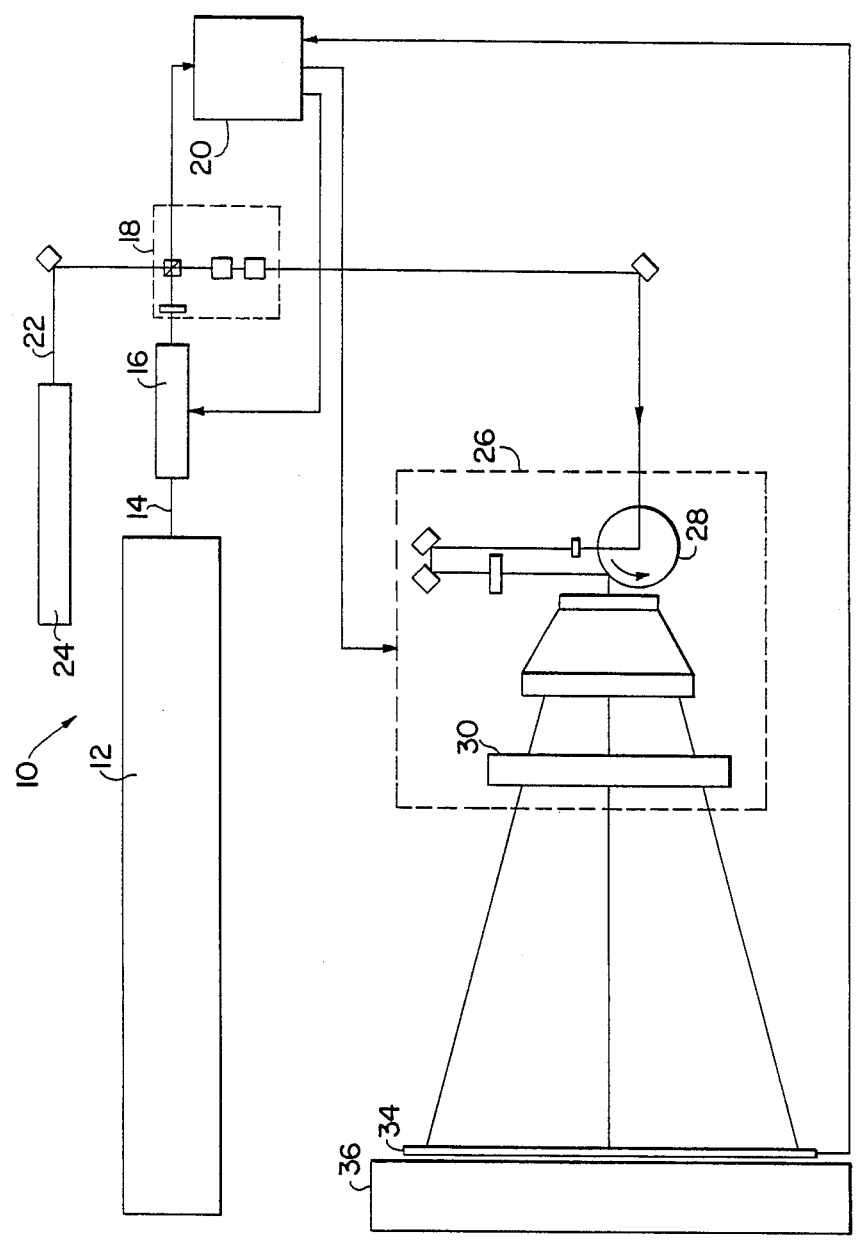
FIG. 1 is a simplified schematic illustration of a laser scanner having passive facet tracking provided according to the present invention.

Referring now to FIG. 1, there is schematically shown a top illustration of a laser raster scanner 10 provided according to the present invention. An optical source 12, preferably a Coherent 4 W Argon-ion laser, generates a beam 14 which is received by an electro-optic modulator 16 and then presented to beam forming optics 18. The beam forming optics is conventional and can comprise such lines and photodetectors as is required by the specific application.

Also included in FIG. 1 is a controller 20 which receives signals from a detector associated with the optics 18 and provides modulation control signals to the electro-optic modulator 16 in a known manner. A reference beam 22 colinear with the beam 14 is generated by a laser 24. Typically, the laser 24 comprises a HeNe laser such as is marketed by the Melles Griot Co.

The combined illuminating beam is received by an optical assembly characterized by passive facet tracking and detailed hereinafter. The assembly 26 comprises a rotating polygonal mirror 28 having a plurality of mirror facets which are rotated about an axis in response to signals received from the controller. The reference beam and an exposure beam are received by a conventional F· theta scan lens 30. The exposure beam is received by final folding mirror 34 and presented to a write platen out of the plane of the scanner, not shown and not part of the present invention. The reference beam is simultaneously presented to reference mask and photodetector array 36 of a type known in the art and provides signals indicative of the received reference beam to the controller for controlling the timing, and hence the modulation of the scanned beams. The controller in the preferred embodiment comprises such processor and memory means as necessary to perform the functions detailed herein.

As noted hereinabove, there are typically three types of laser raster scanning systems; (1) scanners which are characterized by an underfilled facet illumination, (2) overfilled facet illumination or (3) those in which the facet is just filled and which has facet tracking. Those scanners characterized by underfilled facet illumination have a minimum percent dead time which is set by that portion of the scan required to move the facet tip through the beam as compared with the time in which the beam is on the facet. With scanners providing overfilled facet illumination, the percent dead time is extremely small since the facet is always within the beam. With scanners having facet tracking, the input beam to the mirror is laterally moved in conjunction with the rotating facet. Each mode is characterized in accordance with the following table:

| | Scan Modes | | |
|---|---|---|---|
| | Under filled | Overfilled | Facet Tracked |
| Scan efficiency (limitation) | $- W_B$ $W_F$ | $\approx 100\%$ (Scan Angle Limited) | $\approx 100\%$ (Scan Angle Limited) |
| Optical efficiency | $\approx 100$ | $<<50\%$ | $\approx 100\%$ |
| Spinner diameter | $N.W_{F/\pi}$ (Larger) | $N.W_{B/\pi}$ (Smaller) | $N.W_{B/\pi}$ (Smaller) |
| Number of facets Limitations | Less Facet Must Be Flat Over Larger Area | More More Facets Difficulty Achieving Beam Uniformity | More More Facets Virtual Pivot Needs Tracking Mechanism |

$W_B$ = Projected Beam Diameter
$W_F$ = Facet Width

As noted above, a system which employs facet tracking possesses the most advantages because both the temporal and optical efficiencies are high. In known systems having facet tracking, the major drawback has been system complexity due to the number of additional components required.

Referring now to FIGS. 2 and 3, there is shown in top and elevational views, respectively, the optical assembly 26 of FIG. 1. The assembly 26 includes the polygonal mirror 28 which is preferably mounted on air bearing flange 38. The mirror is rotatable about an axis 40 in response to signals from the controller 20 of FIG. 1. The assembly 26 of FIG. 1 is characterized by a first beam steering mechanism 42 which is configured to receive the incoming beams and present those beams along the rotational axis to the center of the rotating polygonal mirror. The beam steering mechanism 42 comprises lens 44 and turning mirror 46.

The beams exit the first beam steering mechanism and are presented to an optically transparent window 48. The window is one of a plurality of windows configured on the top surface of the mirror 28. As detailed hereinafter, each window is configured to provide a displacement of the beams in conjunction with the facet rotation. The beams exit the window and are received by a second beam steering mechanism 50 which preferably comprises a telescope 52 including a plurality of mirrors 54 and 56 and lenses 58 and 61. The beams are then turned back towards the mirror facet by means of mirrors 60 and 62 before passing through collimating lens 64 and onto the mirror facet.

With the present invention, the glass window displaces the beam in the direction of rotation of the facet so that the illumination beam moves in synchronism with the facet. In FIG. 4, there is shown a section of a glass window 66 which receives an incoming beam shown schematically as an optical ray 64 at an angle (I) 70 to the window surface normal 72. The window is characterized by a thickness (t) 74 and an index of refraction (N). The ray is displaced from its original direction by an amount (D) 76 given by the following formula:

$$D = t \operatorname{Sin} I \left[ 1 - \sqrt{\frac{1 - \operatorname{Sin}^2 I}{N^2 - \operatorname{Sin}^2 I}} \right]$$

Figure 4A:
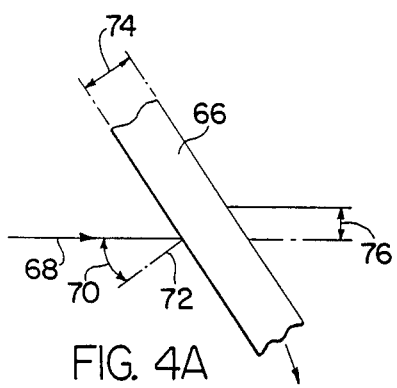
FIG. 4a is an illustration of a portion of the optical assembly of FIG. 2 showing a first position of the optical beams.
Figure 4B:
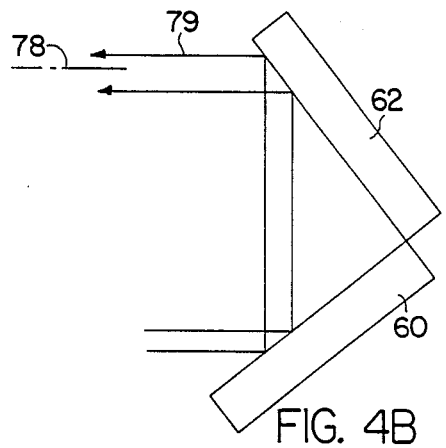
FIG. 4b is a simplified illustration of a first position of the beams incident on turning mirrors in the optical assembly of FIG. 1.

FIG. 4b schematically illustrates the corresponding position 78 of the beam 79 with respect to the turning mirrors 60 and 62 at the window position of FIG. 4a.

Figure 5A:
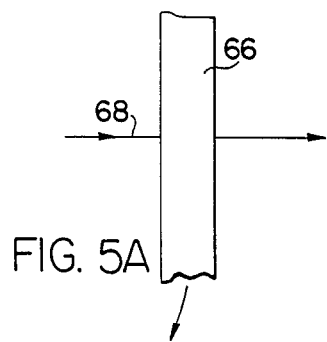
FIG. 5a is an illustration showing the optical assembly portion of FIG. 4a rotated to a second position.
Figure 5B:
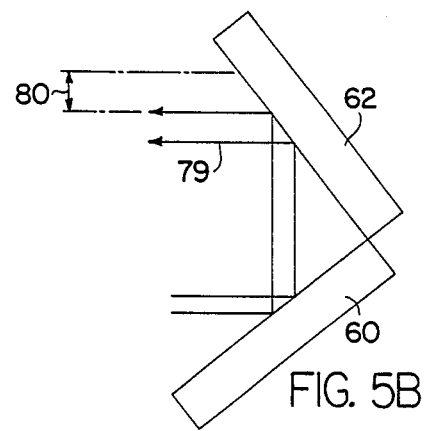
FIG. 5b is a simplified illustration of a second position of the beams incident on turning mirrors in the optical assembly of FIG. 1.
Figure 6A:
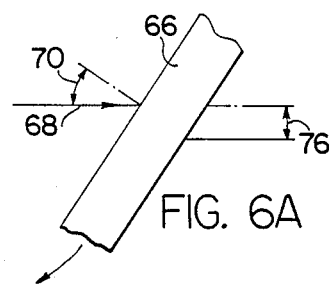
FIG. 6a is an illustration of the optical assembly portion of FIG. 4a rotated to a third position.
Figure 6B:
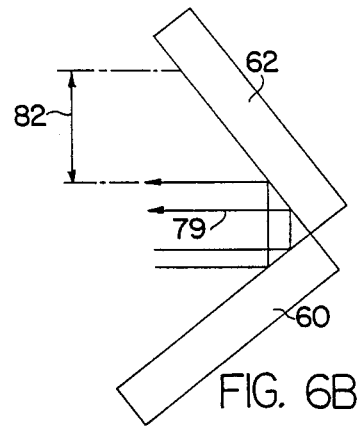
FIG. 6b is a simplified illustration of a third position of the beams incident on turning mirrors in the optical assembly of FIG. 1.

FIG. 4, taken with FIGS. 5 and 6, schematically illustrate the effect of the glass window configured with the rotating mirror. As the mirror rotates, so does the glass window. Each glass window 66 receives the beam initially at an angle with respect to the surface normal 72. The beam is displaced towards the center of the glass window. As the glass window and mirror rotate, the beam now illuminates the glass windows at right angles to the glass window such that there is no displacement from the incident beam axis (FIG. 5a). However, as shown in FIG. 5b, the beam is effectively displaced by an amount 80 from its initial position allowing the beams to continue and illuminate the corresponding facet. FIG. 6a shows the beam on the rotating glass window at a third position. The beam displacement 82 is continued, further allowing the beam to illuminate the rotating facet.

Those skilled in the art will note that in the preferred embodiment, the beam is jogged towards the center of the window which is the direction that affords the greatest increase in optical efficiency. This provides the highest obtainable duty cycle or time efficiency since the refraction produced by the glass windows directs the beam towards the middle of the window at its exit and maintains the beam on the facet face for the longest period of time. Optical efficiency is improved to over 90 percent from a typical value of 60 percent which is characteristic of filled facet illumination scanning systems without facet tracking.

Figure 7:
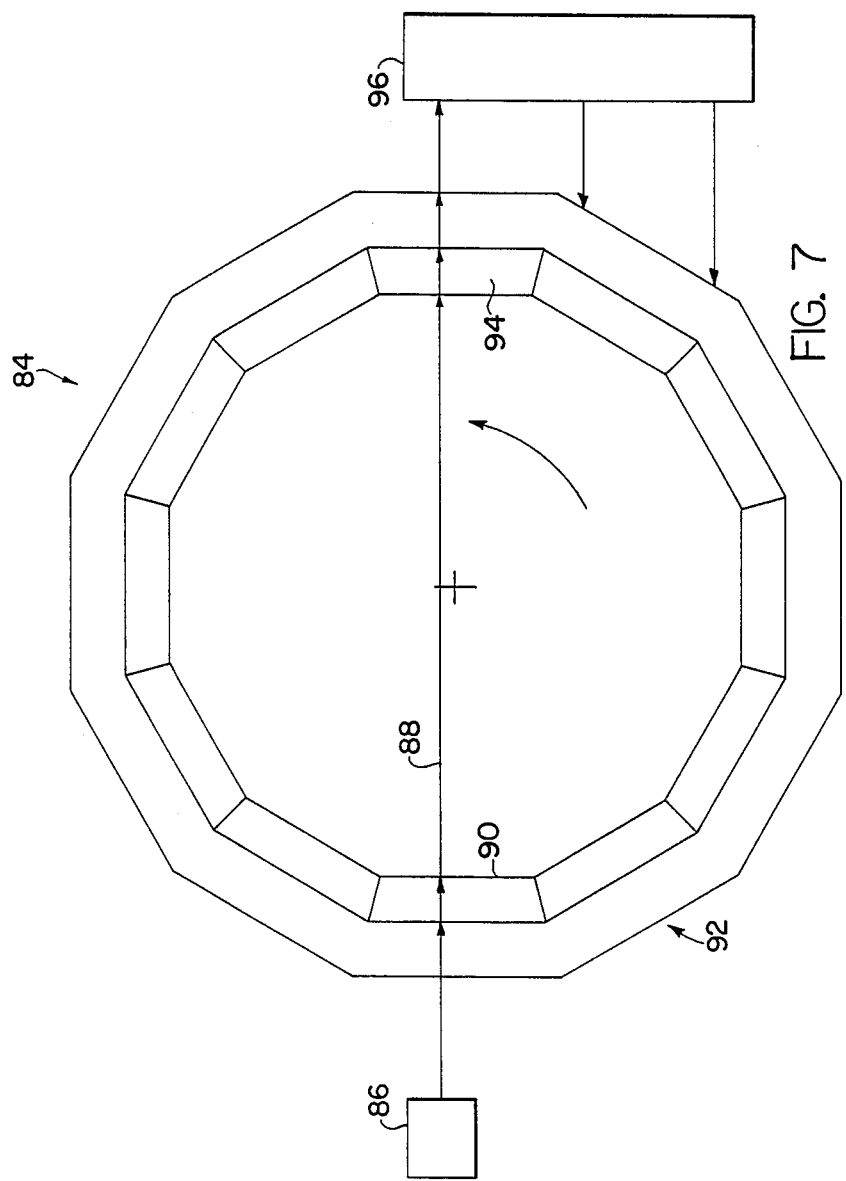
FIG. 7 is a schematic illustration of a portion of an alternative apparatus that provides passive facet tracking according to the present invention.

An alternative passive facet tracking apparatus 84 is schematically illustrated in top view in FIG. 7. The apparatus 84 is similar to the embodiment of FIG. 1 except windows are used in pairs and is characterized by a beam steering device 86 which presents beam 88 to a first window 90 positioned on the periphery of polygonal mirror 92 and then to a diametrical glass window 94. The beam is shifted as it passes through both windows before being presented to a second beam steering apparatus 96 that is similar to the apparatus described hereinabove with respect to FIG. 1. Note that the beam shift provided by the alternative apparatus is not towards the center of the window for the first window encountered and therefore, the same optical efficiency is not achieved as compared with the preferred embodiment. A second alternative scheme involves using a solid refractive polygon as a further refinement of FIG. 7. This technique, however, suffers from the same limitations as does the embodiment of FIG. 7.

The facet tracking provided for by the present invention is completely passive and is exclusively optical. As such, the present invention stands in stark contrast to known scanning systems having facet tracking but which do so in an active manner employing a variety of detectors, acousto-optic or electro-optic modulators and other electronics. Since the technique is passive there is no need to further correct for intensity related effects which can be encountered with active techniques. This technique also lends itself to polychromatic systems which is not possible with some active techniques. Finally, since it is passive, there is no speed dependence in the facet tracking.

Figure 8:
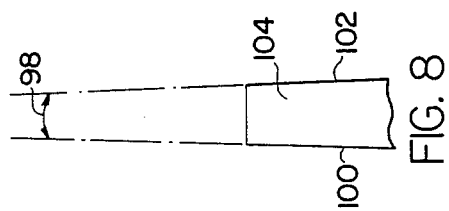
FIG. 8 is a schematic illustration of a portion of a window used in the optical assembly of FIG. 2 that provides compensation for facet-to-mirror axis error.

Note that the horizontal angle of the opposed faces of the window in the window-to-window dimension is not critical since this error is in the sweep direction. As shown in FIG. 8 however, the acute angle (or wedge angle) 98 formed between the two opposed faces 100,102 of a glass window 104 can be significant in the cross-scan dimension. In fact, with the present invention, the glass window can be used to provide compensation for the facet-to-mirror axis pyramid error which is present in rotating polygonal mirrors. This error is commonly generated as a result of imperfections in the alignment between the mirror facet and the rotation axis such that the facet is tipped slightly towards or away from the axis which produces a nonsuperposition of the scan lines from multiple facets. It is difficult to provide compensation for this error with known systems but is done easily with the present invention since each facet has an associated window. As detailed in FIG. 8, the window is configured with a wedge angle equal (by the beam magnification ratio) in magnitude to and opposite in sign, the facet-to-axis angular error will be cancelled. Thus, the angular error of each mirror facet can be compensated individually by selection the corresponding glass window with a matched error.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. In a laser raster scanner that scans, in response to control signals from a controller, an exposure beam across a substrate by means of a rotating polygonal mirror having a plurality of reflective facets, an apparatus for providing passive facet tracking, comprising:
    an optical displacement means including a plurality of glass windows, each window having a fixed position relative to an associated one of the reflective facets;
    a first beam steering means for providing the laser beam along an axis to said windows at a first surface thereof;
    a second beam steering means for receiving said laser beam from an opposed second window surface and providing an illumination beam to said corresponding one of said reflective facets; and
    each of said glass windows positioned to displace said laser beam from said incident axis so as to produce a corresponding displacement of said illumination beam incident on the facet in the direction of mirror rotation.

2. The apparatus of claim 1 wherein each of said facets has a facet-to-mirror rotational axis angular error and said corresponding windows is characterized by a wedge angle between said first and second surfaces whose magnitude corrects reflective facet induced errors in the scan direction.

3. The apparatus of claim 1 wherein said beam displacement means further comprises a single glass window per facet.

4. The apparatus of claim 1 wherein said beam displacement means further comprises a pair of glass windows diametrically positioned with each of the mirror facets.

5. The apparatus of claim 1 wherein said second beam steering means comprises an optical telescope means for expanding said illumination beam.

6. In a laser raster scanner that scans, in response to control signals from a controller, an exposure beam across a substrate by means of a rotating polygonal mirror having a plurality of reflective facets, an apparatus for providing passive facet tracking, comprising:
- an optical displacement means including a solid transparent polygon with the same number of refractive faces as reflective mirror facets to cooperate with corresponding ones of the reflective facets;
- a first beam steering means for providing the laser beam along an axis to said windows at a first surface thereof;
- a second beam steering means for receiving said laser beam from an opposed second window surface and providing an illumination beam to said corresponding one of said reflective facets; and
- each of said glass windows positioned to displace said laser beam from said incident axis so as to produce a corresponding displacement of said illumination beam incident on the facet in the direction of mirror rotation.

7. A laser scanner for scanning an exposure beam across a substrate, comprising:
- a laser for generating a laser beam;
- an addressable beam modulator for providing modulation of the laser beam;
- a rotatable polygonal mirror having a plurality of reflective facets;
- an optical displacement means including a plurality of glass windows each having a first surface and each having a fixed position relative to an associated one of said facets;
- a first beam steering means for providing the laser beam along an axis to said windows at said first surface;
- a second beam steering means for receiving said laser beam from an opposed window second surface and providing an illumination beam to said corresponding one of said reflective facets;
- each of said glass windows positioned to displace said laser beam from said window incident axis so as to produce a corresponding displacement of said illumination beam on the facet in the direction of the mirror rotation; and
- a means for controlling said beam modulator and said rotatable mirror.

8. The apparatus of claim 7 wherein said beam displacement means further comprises a single glass window per facet.

9. The apparatus of claim 7 wherein said beam displacement means further comprises a pair of glass windows diametrically positioned with the mirror per facet.

10. The apparatus of claim 7 wherein said optical displacement means comprises a solid transparent polygon with twice the number of refractive faces as reflective mirror facets.

11. A laser raster scanner for scanning an exposure beam across a substrate, comprising:
- a laser for generating a laser beam;
- an addressable beam modulator for providing modulation of the laser beam;
- a rotatable polygonal mirror having a plurality of reflective facets, each of the facets having a facet-to-mirror rotational axis angular error;
- an optical displacement means including a plurality of glass windows each having a first surface and each configured with the polygonal mirror to cooperate with corresponding ones of said facets;
- a first beam steering means for providing the laser beam along an axis to said windows at said first surface; and
- a second beam steering means for receiving said laser beam from an opposed window second surface and providing an illumination beam to said corresponding one of said reflective facets;
- each of said glass windows positioned to displace said laser beam from said window incident axis so as to produce a corresponding displacement of said illumination beam on the facet in the direction of the mirror rotation and each of said windows characterized by a wedge angle between said first and second surfaces whose magnitude corrects the respective facet induced error; and
- a means for controlling said beam modulator and said rotatable mirror.

12. In a laser raster scanner that scans, in response to control signals from a controller, an exposure beam across a substrate by means of a rotating polygonal mirror having a plurality of reflective facets characterized by a facet-to-mirror axis error, an apparatus for providing compensation for mirror facet error, comprising:
- an optical displacement means including a plurality of glass windows having a fixed position relative to an associated one of the reflective facets, said windows having first and second opposed faces configured with a wedge angle there between whose respective sign and magnitude cancel said reflective facet mirror axis to facet error;
- a first beam steering means for providing the laser beam along an axis to said windows at a first surface thereof; and
- a second beam steering means for receiving said laser beam from an opposed second window surface and providing an illumination beam to said corresponding one of said reflective facets.

13. The apparatus of claim 12 wherein said second beam steering means comprises an optical telescope means for expanding said illumination beam.

* * * * *